United States Patent

[11] 3,598,010

| [72] | Inventor | Louis Jean Chambon<br>Paris, France |
|---|---|---|
| [21] | Appl. No. | 758,455 |
| [22] | Filed | Sept. 9, 1968 |
| [45] | Patented | Aug. 10, 1971 |
| [73] | Assignee | Societe D'Etudes De Machines Speciales<br>Societe Anonyme<br>Paris, France |
| [32] | Priority | Sept. 18, 1967 |
| [33] | | France |
| [31] | | 121,344 |

[54] ROTARY CUTTER AND FOLD LINE MARKER
3 Claims, 5 Drawing Figs.

[52] U.S. Cl. ................................................. 83/675,
76/107 C, 83/674, 83/698
[51] Int. Cl. ...................................................... B23d 35/00

[50] Field of Search ............................................. 83/332,
665, 675, 698; 76/107 C

[56] References Cited
UNITED STATES PATENTS

| 2,185,885 | 1/1940 | Bruker et al. | 83/332 X |
| 3,119,312 | 1/1964 | Henc | 93/58.2 |

*Primary Examiner*—Andrew R. Juhasz
*Assistant Examiner*—Leon Gilden
*Attorneys*—Robert E. Burns and Emmanuel J. Lobato

ABSTRACT: Rotary tool for cutting and/or marking fold lines comprises a cylindrical layer of hard plastic material having embedded therein at least one metal blade of which the outer edge projects from the outer surface of said plastic layer. The blade is locked in place by a metal bar received in a hole in the blade and aligned bores in the plastic layer on opposite sides of the blade.

ROTARY CUTTER AND FOLD LINE MARKER

BACKGROUND OF THE INVENTION

The present invention relates to a rotary cutting tool also adapted to mark fold lines, and to the method of manufacturing same.

For cutting a material such as paper, cardboard, etc... in sheet or web form, and also for marking fold lines on the surface of this material, two types of devices are already known, namely those performing the cutting or marking operation by means of a flat tool and those utilizing a rotary tool.

The flat-cutting system is advantageous in that the cutting tool can be made without difficulty by means of a metal blade inserted into slots formed in a wooden base. On the other hand, the efficiency of a machine operating according to this principle is poor on account of its low rate of operation.

The method of cutting sheet and web material by using a rotary tool affords relatively high rates of operation but is nevertheless objectionable because hitherto known rotary tools used to this end are very costly and take very long to manufacture. As a rule, these tools are manufactured with a high degree of precision from steel cylinders in which grooves or slots are machined for fitting the cutting or marking blades. Other known rotary cutting tools consist of etched cylinders and are therefore particularly fragile and when a cutting edge is broken, the complete cutting tool becomes useless.

SUMMARY OF THE INVENTION

It is the essential object of the present invention to avoid the inconveniences characterizing hitherto known rotary cutting methods by providing a cutting and fold line marking tool based on a different principle and which is extremely economical to manufacture.

To this end, this rotary cutting and/or fold-line-marking tool is characterized in that it comprises a cylindrical layer of hard plastic material having embedded therein at least one metal blade of which the outer edge projects from the outer surface of said layer of plastic material.

According to a complementary feature of this invention, said cylindrical plastic layer is formed on a central metal core and each metal blade engages, or bears on, this core with its inner edge.

It is another object of the invented to provide a method of manufacturing a rotary tool for cutting and/or marking fold lines, of the type broadly set forth hereinabove, this method being characterized in that one or a plurality of metal blades are positioned and held between a cylindrical central core and a coaxial external mould, whereafter a setting plastic material is cast into the remaining space existing between the core and the mould, the metal blade or blades are removed from said cylindrical layer of moulded plastic material upon completion of the setting process, said cylindrical layer of hardened plastic material is machined to reduce its diameter to a value lower than its after-moulding diameter, and finally said blade or blades are refitted in their recesses formed in said plastic layer during the moulding process.

The rotary tool according to this invention is advantageous in that its manufacturing cost is low, compared with that of conventional rotary tools. In fact, it is not necessary to machine beforehand the central core and the tool does not require any elaborate calculations for determining the machining steps to be performed thereon. The tool according to this invention can easily be adapted to the manufacture of small quantities without attaining prohibitive costs.

BRIEF DESCRIPTION OF THE DRAWING

Various possible forms of embodiment of this invention will now be described by way of example with reference to the attached drawing in which.

DESCRIPTION OF THE PREFERRED EMBODIMENT

Figure 1:
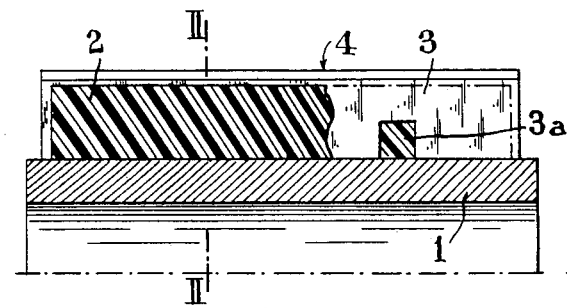
FIG. 1 is a half longitudinal section showing a rotary cutter of the longitudinal blade type.
Figure 2:
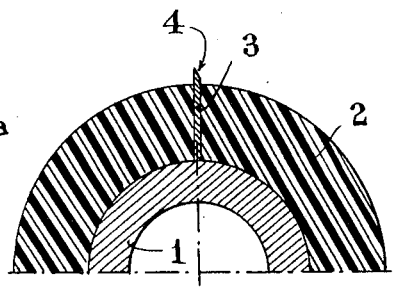
FIG. 2 is a cross-sectional view taken upon the line II-II of FIG. 1.

The cutting tool illustrated in FIGS. 1 and 2 comprises a tubular or cylindrical central core 1 made of steel and having a longitudinal axis. This core 1 carries on its outer surface a cylindrical layer 2 of a rigid plastic material selected from the group characterized by having a relatively great hardness in the set condition. Thus, the plastic material known under the trade name of "Araldite" may advantageously be used for this purpose.

Embedded in the outer layer of plastic material 2 is a longitudinal and radial metal blade 3 formed along its outer end with a bevelled cutting edge 4. In the case of a fold line marking tool, the outer edge of blade 3 is not sharp but slightly rounded. The blade 3 is inserted in a longitudinal radial slit formed during the moulding operation in the outer layer of plastic material 2 and its ends project from the front faces of the layer 2. The blade 3 bears with its inner edge against the outer surface of layer 2.

The blade 3 has castellationlike notches 3a formed in its inner edge; these notches are filled during the moulding operation with plastic forming lugs permitting the continuation of the layer 2.

When the above-described cutting tool is fitted to a rotary shaft, the cutting metal blade 3 coacts during each revolution with a plain surfaced countercylinder or roll and thus cuts a paper of cardboard sheet or web inserted therebetween.

The longitudinal radial cutting blade 3 is retained by frictional engagement in the slit formed in the plastic layer 2, so that it can easily be replaced, in case the sharp cutting edge 4 becomes damaged, by force fitting another blade in the slit.

Figure 3:
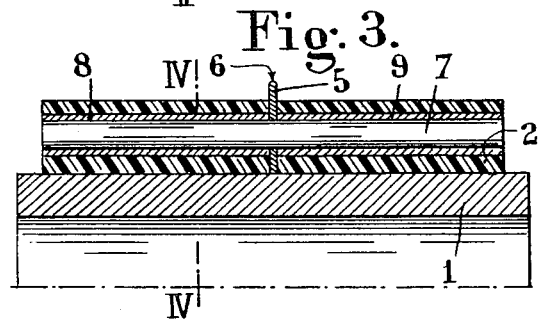
FIG. 3 is a half longitudinal section showing a rotary tool for marking fold lines, this tool being of the transverse blade type.
Figure 4:
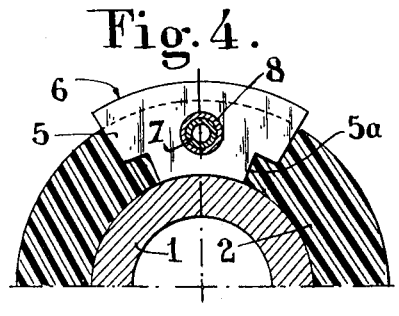
FIG. 4 is a cross section taken along the line IV-IV of FIG. 3.

In the form of embodiment illustrated in FIGS. 3 and 4, the central cylindrical metal core 1 also carries an outer layer 2 of hard plastic material having at least one blade 5 embedded therein and extending transversely to the longitudinal core axis. As can be seen in FIG. 4, this blade 5 has the shape of an annular sector of which the arcuate outer edge 6 projects from the outer surface of the plastic layer 2 and the arcuate inner edge bears on the central metal core 1. As seen in FIG. 4, the end edges of the blade 5 are generally radial but radially inner portions are notched inwardly toward one another at 5a to reduce the arcuate length of the arcuate inner edge. In this case, the outer edge 6 is slightly rounded in order to provide the sheet- or web-marking feature by coacting with a suitable counter cylinder.

In this specific form of embodiment, the transverse fold line marking blade is releasably retained in a slit formed in the plastic layer 2 by means of a longitudinal locking rod 7 extending through an orifice formed in the blade 5 and also through the plastic layer 2. This locking rod 7 extends through a pair of distance in the form of pieces coaxial metal sleeves 8 and 9 disposed on either side of the blade 5 and embedded in the plastic layer 2.

To replace the blade 5 it is only necessary to extract the rod 7 from said sleeves 8 and 9 in order to free the blade 5 so that another blade can be inserted in the slit formed in the plastic layer 2.

Of course, a same cutting tool may comprise a plurality of longitudinal blades such as 3 and/or transverse blades such as 5, or alternately cutting blades and fold line marking blades having any suitable curved shape.

According to a modified form of embodiment the central core 1 may be dispensed with. In this case the rotary tool consists of a single tubular layer 2 of hard plastic material and the blades 3 and 5 bear with their inner edges directly on the outer surface of the driving shaft on which the rotary tool is mounted. The ends of each longitudinal blade 3 do not project from the plastic layer 2 as in FIG. 1 but on the contrary this blade 3 is surrounded on all sides by the layer of plastic material, with only its outer edge 4 projecting therefrom.

Figure 5:
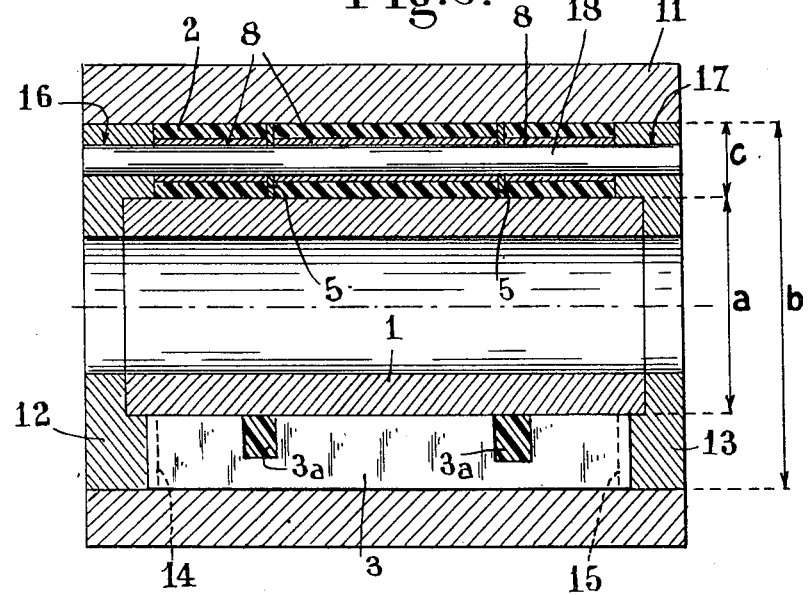
FIG. 5 is a longitudinal section showing a device used for manufacturing a rotary cutter.

Now a method of manufacturing a rotary tool according to this invention will be described with specific reference to FIG. 5.

Firstly, the central metal core 1 to be engaged by the metal blades is machined, the outer diameter $a$ of this core being selected to be equal to the difference between the diameter $b$ corresponding to the format or size selected for performing the cutting or marking operation, and twice the blade with $c$. Of course, a countercylinder or roll is prepared having the diameter $b$ corresponding to the format or size, this countercylinder being firstly turned on a lathe and then ground.

Then a preferably tubular external mould 11 is prepared by moulding a plastic material such as Araldite, between the counterpart cylinder or roll having a diameter $b$ and a tube having a greater diameter.

Subsequently a pair of end pieces 12 and 13 of circular configuration, having a diameter $b$, are prepared, so that they can fit on the two ends of the central core 1. Then, radial grooves 14 and 15 are milled in these end pieces for receiving the ends of the longitudinal blades 3.

Holes such as 16 and 17 adapted to receive a longitudinal rod 18 for positioning the transverse blades 5 are also formed through said end pieces 12 and 13. Sleeves such as 8 acting as distance pieces and holding transverse blades 5 in their proper position are slipped on the sleeves such as 8.

After the various blades 3 and 5 have been positioned externally of the central core 1, they are held in the proper positions by the end pieces 12 and 13, and the resulting assembly is introduced into the outer mould 11 and the plastic material is eventually cast through a suitable hole formed through one of the end pieces 12 and 13, in order completely to fill the free space therein.

After the plastic material has set, the the central core 1, the end pieces 12 and 13, and the set of blades 3 and 5 together with the intermediate filling of set plastic material are removed from the mould 11.

Then the end pieces 12 and 13 are separated from the core 1 and the blades 3 and 5 are disassembled. To this end these blades are covered before the moulding operation with a film of a material inhibiting the adherence of the plastic material thereto.

After the blades 3 and 5 have been removed, the outer surface of the plastic layer is machined to reduce its diameter to a value less than the diameter $b$ corresponding to the format or size. Then the blades 3 and 5 are raised in their relevant slits so that the outer edges of the blades project somewhat from the outer surface of the layer of plastic material.

Finally, if necessary, recesses adapted to receive the cutting blades of any suitable configuration are machined by milling or otherwise in the plastic layer.

Of course, the above-described forms of embodiment of the invention should not be construed as limiting the invention since many modifications and variations may be brought thereto without departing from the spirit and scope of the invention as set forth in the appended claims.

I claim:

1. Rotary tool for cutting or for marking fold lines comprising: a metal cylindrical core having a longitudinal axis, a cylindrical layer of hard plastic material formed on said metal core, at least one metal blade embedded in said layer of hard plastic material and extending transversely to said longitudinal axis, said one metal blade having an outer edge which projects from the outer surface of said cylindrical layer of plastic and an inner edge on which bears said core, means defining a hole in said one transverse metal blade, the plastic layer on either side of said one metal blade having means therein defining longitudinal bores aligned with said hole, and a longitudinal locking rod extending through both the hole in said one metal blade and through said aligned longitudinal bores in said plastic layer to releasably lock in place said one metal blade.

2. Rotary cutting or marking tool according to claim 1, in which said longitudinal bores have positioned therein metal sleeves embedded in the plastic layer on either side of said one metal blade, and in which said locking rod extends through said sleeves and the hole in said one metal blade.

3. Rotary cutting or marking tool according to claim 1, in which said outer and inner edges of said one metal blade are arcuate, said one metal blade having further opposite lateral edges which are generally radial with radially inner portions notched inwardly toward one another, thereby reducing the arcuate extent of said inner edge.